United States Patent [19]
Dattilo

[11] 3,735,989
[45] May 29, 1973

[54] CARTRIDGE LOCKING MECHANISM WITH ADJUSTABLE TENSION

[75] Inventor: Donald J. Dattilo, Mount Prospect, Ill.

[73] Assignee: Motorola Inc., Franklin Park, Ill.

[22] Filed: May 12, 1972

[21] Appl. No.: 252,809

[52] U.S. Cl. ....................274/4 B
[51] Int. Cl. ....................G11b 5/00
[58] Field of Search ....................274/4 B, 11 B, 4 R

[56] References Cited

UNITED STATES PATENTS 3,485,500 12/1969 Loeschner et al....................274/4 B
3,009,024 11/1961 Eash....................274/4 B

FOREIGN PATENTS OR APPLICATIONS 32,268 8/1969 Japan....................274/4 B

*Primary Examiner*—Harry N. Haroian
*Attorney*—Vincent Rauner and Ronald J. La Porte

[57] ABSTRACT

A cartirdge locking mechanism for a tape player includes a roller arm mounted for pivotal movement on a first mounting member and a bistable spring arrangement including a coil spring and a threaded pin, the former being screwable onto the latter, coupled between the roller arm and a second mounting member to operate the roller arm between two stable positions. A leaf spring connected to the roller arm extends into a cartridge receiving tunnel of the tape player for deflection by a cartridge inserted thereinto. Deflection of the leaf spring snaps the bistable spring arrangement from a first to a second stable state causing the roller to engage and be received in a notch in the side wall of the cartridge to removably secure the latter in the tunnel. The force provided by the bistable spring arrangement through the roller, is adjustable by screwing or unscrewing the coil spring member of the bistable spring arrangement with respect to the pin member coupled to the roller arm.

6 Claims, 3 Drawing Figures

Patented May 29, 1973 3,735,989

CARTRIDGE LOCKING MECHANISM WITH ADJUSTABLE TENSION

BACKGROUND

This invention relates generally to cartridge type tape players which include locking mechanisms for securing a cartridge therein and more particularly to a cartridge locking mechanism for use in a tape player adapted to receive a cartridge having a notch or recess formed along a side wall thereof.

It is desirable in a tape player wherein cartridges are inserted for playback to include means for firmly positioning the cartridge in the player with the tape therein held against apparatus for driving the tape through the cartridge and for playing the tape. A locking mechanism for use in a tape player to maintain a tape cartridge firmly in position in the player is illustrated in copending U.S. Pat. application, Ser. No. 136,923, filed Apr. 23, 1971 in the name of William B. Huber and assigned to the same assignee as the instant invention.

The force applied by locking mechanisms of the above described type and provided in tape players for the above described purpose, is for the most part satisfactory to maintain the cartridge in position for playback of information on the tape. Occasionally, however, due to manufacturing processes, etc., a locking mechanism, when assembled, will provide either too great or inadequate force in the particular tape player chassis in which it is mounted. Consequently, it would be desirable to be able to adjust the holding force provided by the locking mechanism to suit any particular circumstance.

SUMMARY

Accordingly, it is a primary object of the present invention to provide in a cartridge type tape player, a new and improved locking mechanism for removably securing a cartridge in the player, which may be adjusted to provide a greater or lesser force against a cartridge inserted into the player.

It is yet another object of the present invention to provide a cartridge locking mechanism of the last described type which is effective in operation, easily adjustable and relatively inexpensive to manufacture.

Briefly, a preferred embodiment of the cartridge locking mechanism according to the invention comprises a leaf spring projection which extends from a pivotally mounted roller carrying arm into the cartridge receiving tunnel of a tape player housing in the path of a cartridge received therein. An overcenter spring mechanism including a coil spring and a pin having a threaded shaft portion coupled pivotally to the roller carrying arm and receivable in the coil spring, is coupled to a link which is held by the force of the coil spring in engagement with a mounting post. When the over-center spring mechanism is in a first stable state, the roller is maintained out of the cartridge receiving tunnel. Upon inertion of a cartridge into the tunnel, an inclined corner of the cartridge engages the leaf spring to bend or deflect the latter with the spring riding along the cartridge side wall. Substantially at the time the leaf spring is engaging a flat surface of the cartridge side wall, sufficient force is provided against the spring to cause the overcenter spring mechanism to snap to its second stable state, forcing the roller carrying arm to be pivoted. The last-mentioned motion moves the roller into engagement with a flat portion of the side wall of the cartridge. Continued insertion of the cartridge into the tunnel causes the roller to snap into the notch provided in the cartridge side wall. The force of the roller against the cartridge when received in the notch is controlled by the relation of the coil spring and threaded pin member with respect to each other. Screwing the coil spring more onto the threaded pin member provides a lesser force through the roller against the cartridge and vice versa.

Removal of the cartridge from the cartridge receiving tunnel of the player, forces the roller from the notch. Further withdrawal of the cartridge from the tunnel permits the leaf spring to assume its original position, whereby the overcenter spring mechanism snaps back to its first stable position, driving the roller out of the cartridge tunnel and from the path of the cartridge.

The locking mechanism is mounted on the side wall of the tape player chassis betewen a pair of spaced mounting points. The coil spring described heretofore serves both to maintain the components of the locking mechanism in an assembled condition, as well as to provide the necessary force to snap the roller into and out of the notch in the cartridge side wall.

DETAILED DESCRIPTION

Figure 1:
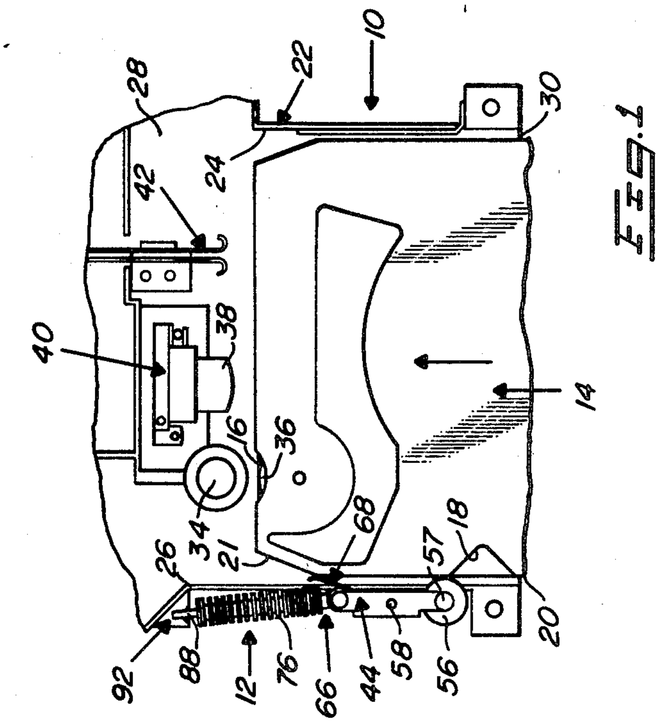
FIG. 1 is a bottom plan view of a cartridge type tape player incorporating a cartridge locking mechanism according to the invention.

Referring now to the drawing in greater detail wherein like numerals are employed throughout the various views to designate similar components, there is illustrated in FIG. 1 a cartridge type tape player 10 in which a locking mechanism 12 according to the invention is employed.

The tape player 10 is adapted to receive and play a tape cartridge 14 of the conventional type having a recorded multi-track tape 16 mounted therein and a notch or groove 18 formed along a side wall 20 thereof. The side wall 20 likewise includes at the leading end of cartridge 14, an inclined section 21.

The tape player 10 includes a cast metal housing or chassis 22 having a pair of side walls 24, 26 interconnected by a wall 28 to form a cavity or tunnel 30 with an open end through which the cartridge 14 is received.

Mounted on wall 28 of chassis 22, in communication with tunnel 30, is a capstan shaft 34 against which a pressure roller 36 mounted in the tape cartridge and over which tape 16 passes, is pressed upon insertion of the cartridge into tunnel 30. The capstan shaft is driven in the usual manner by a motor and pulley arrangement (not shown) to move the tape 16, sandwiched between the capstan shaft and pressure roller, through cartridge 14 past a magnetic tape head 38 also mounted on the wall 28 of chassis 22 in communication with tunnel 30.

The magnetic tape head 38 is mounted on wall 28 by means of a mounting bracket assembly 40, designed to permit movement of the tape head in a plane adjacent the tape 16 in a direction transverse the movement of the tape for the purpose of selectively certain ones of the various tracks thereon. Apparatus (not shown) is also provided in tape player 10 to position automatically the tape head with respect to the various tape tracks in response to the detection by a contact set 42, mounted on base wall 28 of chassis 22, of a conductive strip (not shown) on the magnetic tape.

The cartridge locking mechanism 12 according to the invention is mounted on a side wall 26 of the chassis of the tape player 10, adjacent and extending parallel to the notch or grooved side wall 20 of the tape cartridge received in the tunnel 30.

Figure 3:
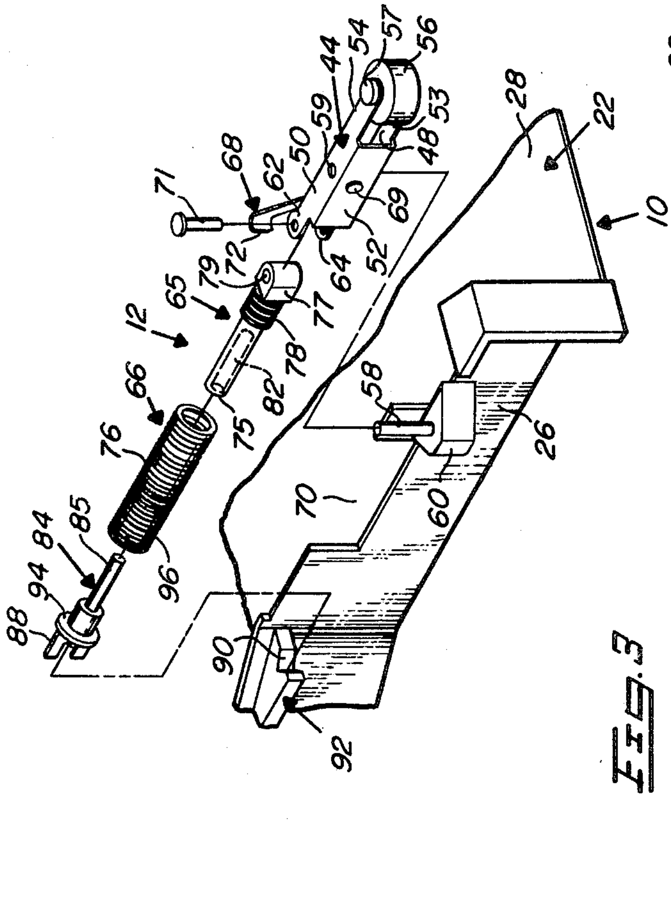
FIG. 3 is an exploded, fragmentary, isometric view of the cartridge locking mechanism and cartridge tape player housing, illustrating the assembly of the former with the latter.

Referring now to FIG. 3 of the drawing, it can be seen that the cartridge locking mechanism 12 includes an arm member 44 formed of a single piece of stamped metal having first and second opposing side walls 48, 50 joined by a third wall 52. The two walls 48, 50 each include an extension portion or tab, 53, 54, respectively at a first free end thereof to accommodate therebetween a roller 56 mounted for rotation on a pin 57 extending through the tabs and roller.

A pin 58 extends from a mounting post 60 formed along the side wall 26 of the player chassis through apertures such as 59 in side walls 48, 50 of the arm 44 near the center thereof. The arm 44 is pivotal on pin 58 adjacent post 60.

The opposite end of arm 44 also includes a pair of opposing tabs 62, 64 to accommodate a pin member 65 included in an overcenter spring mechanism 66 to be described.

A leaf spring actuator 68 is attached by a suitable fastener 69 to wall 52 of the pivotally mounted roller carrying arm 44, and extends therefrom through an aperture 70 in the side wall 26 of the chassis into the cartridge receiving tunnel in the path of a cartridge received therein. The leaf spring actuator includes a free end 72 curved back on itself for sliding engagement with the side wall 20 of a cartridge 14 received in the tunnel 30.

The snapover or overcenter spring mechanism 66 described heretofore, includes pin 65 and a coil spring 76 in which one end 75 of the pin 65 is received. The opposite end 77 of the pin 65 is pivotally attached to arm 44 by a suitable fastener 71 received in an aperture 79 therein and through tabs 62, 64 of arm 44. End 77 of pin 65 includes a threaded section 78, the threads of which are pitched complementarily to the pitch of the coils of spring 76. The remaining shaft portion of pin 65 is smooth. An axial bore or cavity 82 extends into end 75 of pin 65. A second pin or link 84 includes a shaft portion 85 dimensioned for receipt in bore 82 of pin 74. The opposite end 88 of pin 84 is forked for receipt in notch 90 of a second mounting member 92 formed along wall 26 of chassis 22. A collar portion 94 adjacent forked end 88 of pin 84 is positioned for abutting engagement with the end 96 of coil spring 66. The collar portion 94 is of a diameter sufficiently large to prevent insertion thereof into the central opening of spring 66. Collar portion 94 limits the insertion of pin 84 into coil spring 76.

The assembly of locking mechanism 12 on chassis 22 of the tape player is as follows:

Arm 44 is first positioned to receive pin 58 extending from mounting post 60 of the tape player wall 26, in apertures 59 in walls 48, 50 of arm 44, to mount the last-mentioned arm pivotally on post 60. Next, one end of coil spring 76 is fitted over end 75 of pin 65 coupled to the arm 44. The coil spring is rotated and screwed onto the threaded section 78 of pin 65. Afterwards, the second pin member or link 84 is inserted into the open end 96 of coil spring 76 so that the shaft portion 85 of the pin 84 is received also in central bore or cavity 82 of pin member 65. The collar portion 94 of pin 84 engages end 96 of coil spring 76. The spring is thereby compressed so that forked end 88 of pin 84 can be mated with notch 90 on the mounting member 92.

When assembled as described, the compressed coil spring 76 is capable of snapping arm 44 to two stable or snapover positions. The force provided by spring 76 to hold the arm 44 in these positions is adjustable. The adjustment of the force provided by spring 76 is made easily by rotating spring 76 with respect to pin member 65 to screw the coil spring further onto or off of the threaded portion 78 thereof. Increased spring force is provided by unscrewing, partially, the coil spring from the pin member, while decreased force is provided by screwing the coil spring and pin member together.

For purposes of affording a more complete understanding of the invention, it is advantageous now to provide a functional description of the mode in which the component parts thus far described cooperate.

Referring now to FIG. 1 of the drawing, a cartridge 14 is shown being inserted in the direction of the arrow, into the open end of cartridge receiving tunnel 30. Initially, the leading inclined portion 21 of the side wall 20 of the cartridge engages leaf spring actuator arm 68. Leaf spring 68 rides along and is deflected or is loaded by side wall 20 as the cartridge continues to be inserted into tunnel 30 toward the tape playing and driving instrumentalities. Prior to or by the time the end of spring 68 passes the inclined section 21 of side wall 20, the force provided against spring 68 pivots arm 44 about mounting post 60 on pin 58 sufficiently to snap bistable spring mechanism 66 from a first stable state to move roller 56 into engagement with side wall 20 of the cartridge. Likewise, pin 84 pivots at forked end 88 thereof with respect to mounting post 92.

Figure 2:
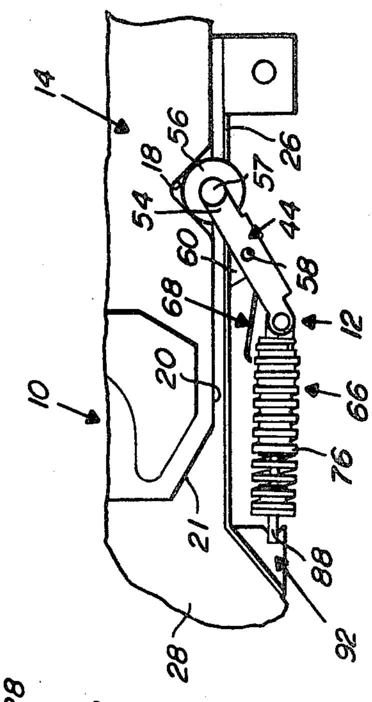
FIG. 2 is a fragmentary bottom view of the cartridge player of FIG. 1, illustrating the operation of the cartridge locking mechanism upon insertion of the cartridge into the player.

Further inspection of the cartridge into tunnel 30 causes roller 56 to enter notch 18 in side wall 20 (FIG. 2). At this time, arm 44 is pivoted sufficiently to cause the bistable spring mechanism to snap to its second stable state, forcing roller 56 into notch 18 in side wall 20 of the cartridge. Cartridge 14 need only be inserted to the point of initial entry of roller 56 into groove 18, since the force of the snapover spring 76 at that time is sufficient to move the roller into notch 18 of the cartridge, thereby to move the latter to a fully inserted position in tunnel 30 with the tape in engagement with the playing and driving instrumentalities. Once fully inserted, the cartridge is maintained in tunnel 30 by locking mechanism 12.

In the event the force provided by spring 76 through roller 56 to the cartridge 14, is inadequate, because of manufacturing discrepancies, either in the case of the cartridge, tape chassis, or the locking mechanism, the force can be increased simply by unscrewing, partially, the coil spring along the threaded section 78 of pin member 65. The unscrewing or separation of the coil spring and pin member 65 with respect to each other provides a greater tension to spring 76, thus providing a greater force to roller 56 when the snapover spring assembly is in the second stable state. Likewise, if the force is too great, thus making it difficult to insert and withdraw a cartridge from the tunnel 30, the coil spring 76 may be screwed further onto the threaded portion 78 of pin member 65 to decrease the force provided by the bistable mechanism.

Withdrawal of cartridge 14 from tunnel 30 forces roller 56 from notch 18 and pivots arm 44 about post 60. Roller 56 and leaf spring 68 both move along side wall 20 until the leaf spring is relaxed sufficiently to permit arm 44 to be pivoted in an opposite direction about the post 60. Bistable spring mechanism snaps from the second to the first stable state, returning the arm 44 in roller 56 to their initial positions (FIG. 1).

Thus, the cartridge locking mechanism according to the invention provides an efficient means for positively securing a tape cartridge in a tape player. Further, the cartridge locking mechanism permits adjustment of the force provided thereby against a cartridge inserted into a tape player in which the locking mechanism is employed, to insure that the cartridge pressure roller and tape are held sufficiently in contact with the tape driving and playing instrumentalities of the tape player.

While a particular embodiment of the invention has been shown and described, the invention is not limited thereto since many modifications thereof can be made. It is therefore contemplated to cover by the present application any and all such modifications as fall within the the true spirit and scope of the appended claims.

I claim:

1. A cartridge locking mechanism for a tape player having a chassis including a pair of predeterminedly spaced side walls defining a tunnel for receiving a tape cartridge, one of the side walls of said chassis having a pair of spaced mounting members provided theron, and instrumentalities for driving and playing a recording tape in the cartridge upon insertion of the latter into said tunnel, said locking mechanism including in combination; an arm having cartridge engaging means mounted for pivotal movement on a first one of said mounting members, said arm being movable between a first position whereat said cartridge retaining means is positioned outside of said tunnel and a second position whereat said cartridge retaining means is positioned within said tunnel for engagement with a cartridge inserted thereinto in response to the insertion of said cartridge into said tunnel in engagement with said arm for maintaining said cartridge firmly in position within said tunnel and bistable spring means mounted between said pivotal arm and said other mounting member, said spring means including a coil spring member having predeterminedly pitched coils, a first pin coupled pivotally at a first end thereof to said cartridge engaging arm and having threads along a portion thereof, the pitch of which is complementary to the pitch of the coils of said coil spring, said pin being screwed into said coil spring at one end of the latter, a second pin member having a first end received in the opposite end of said coil spring and including an enlarged portion engageable with the free end of said coil spring to limit insertion of said second pin member thereinto, the opposite end of said second pin member being coupled pivotally to said second mounting member, whereby said coil spring is tensioned to provide a predetermined cartridge retaining force through said cartridge engaging means when the cartridge engaging arm is in said second position, said cartridge retaining force being adjustable by selectively screwing said coil spring to different positions with respect to said first pin member.

2. A cartridge locking mechanism as claimed in claim 1 wherein the free end of said first-mentioned pin is elongated and extends within said coil spring a predetermined distance and includes an axial bore therein, and wherein the first end of said second pin member is dimensioned for insertion into the axial bore of said first pin member in mating relation with respect thereto, within said coil spring.

3. A cartridge locking mechanism as claimed in claim 2 further including actuator means coupled to said arm and extending into said tunnel in the path of a cartridge received therein, said actuator means being deflected by said cartridge upon insertion of the latter into said tunnel to move said bistable spring means from a first to a second stable position, thereby to move said cartridge retaining means into engagement with said cartridge.

4. A cartridge locking mechanism as claimed in claim 3 wherein said cartridge includes a notch formed in a side wall thereof and wherein said cartridge retaining means includes a roller mounted at a free end of said pivotal arm, whereby upon insertion of the cartridge into said tunnel, said roller is received in said notch to maintain said cartridge fully inserted in said tunnel.

5. A cartridge locking mechanism as claimed in claim 4 wherein said actuator means includes a resilient member extending from said arm into said tunnel in the path of a cartridge received therein and wherein the leading end portion of a side wall of said cartridge is inclined so that upon insertion of the cartridge into said tunnel, said resilient member initially engages and rides along said inclined portion and is gradually bent until engaging a relatively flat side wall portion of the cartridge, to pivot said arm sufficiently to move said bistable spring means from said first to said second stable state, thereby to move said roller into the notch in said cartridge wall.

6. A cartridge locking mechanism as claimed in claim 2 wherein a first one of said mounting members on said one side wall of said chassis includes a pin extending therefrom, wherein said arm includes an aperture therein for receipt of said pin member, whereby said arm is mounted for pivotal movement on said member, wherein said second mounting member includes a notch formed therein and wherein said free end of said second pin member of said bistable spring means is forked for mating engagement with respect to said notch in said second mounting member.

* * * * *

UNITED STATES PATENT OFFICE

CERTIFICATE OF CORRECTION

Patent No. 3,735,989 Dated May 29, 1973

Inventor(s) Donald J. Dattilo

It is certified that error appears in the above-identified patent and that said Letters Patent are hereby corrected as shown below:

Column 3, line 54, delete "74" and insert -- 65 --.

Signed and sealed this 10th day of December 1974.

(SEAL)
Attest:

McCOY M. GIBSON JR.
Attesting Officer

C. MARSHALL DANN
Commissioner of Patents